US012678981B2

(12) United States Patent
Shannon

(10) Patent No.: US 12,678,981 B2
(45) Date of Patent: Jul. 14, 2026

(54) HELICAL HYDRAULIC HOSE CONFIGURATION

(71) Applicant: Sanctuary Cognitive Systems Corporation, Vancouver (CA)

(72) Inventor: Connor Richard Shannon, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 1027 days.

(21) Appl. No.: 17/871,801

(22) Filed: Jul. 22, 2022

(65) Prior Publication Data

US 2023/0023985 A1 Jan. 26, 2023

Related U.S. Application Data

(60) Provisional application No. 63/224,910, filed on Jul. 23, 2021.

(51) Int. Cl.

| | |
|---|---|
| *B25J 19/00* | (2006.01) |
| *F15B 1/04* | (2006.01) |
| *F15B 1/26* | (2006.01) |
| *F15B 13/02* | (2006.01) |
| *B25J 9/14* | (2006.01) |

(52) U.S. Cl.
CPC ............. *B25J 19/0029* (2013.01); *F15B 1/04* (2013.01); *F15B 1/26* (2013.01); *F15B 13/02* (2013.01); *B25J 9/14* (2013.01)

(58) Field of Classification Search
CPC ...... B25J 19/0029; B25J 9/14; B25J 19/0025; B25J 17/00; F16B 1/26; F16B 13/02; H02G 11/00

USPC ...... 294/213; 74/490.02, 190.05; 901/28–29; 403/34, 39
See application file for complete search history.

(56) References Cited

U.S. PATENT DOCUMENTS

| | | | | |
|---|---|---|---|---|
| 2002/0135334 A1* | 9/2002 | Uematsu | .............. | B25J 19/0029 |
| | | | | 318/568.21 |
| 2003/0200831 A1* | 10/2003 | Matsumoto | .......... | B25J 19/0029 |
| | | | | 74/490.06 |
| 2004/0200304 A1* | 10/2004 | Matsumoto | .......... | B25J 19/0029 |
| | | | | 74/490.02 |
| 2008/0247844 A1* | 10/2008 | Hartrampf | ............... | B21J 15/32 |
| | | | | 901/30 |

(Continued)

*Primary Examiner* — Christopher Garft
(74) *Attorney, Agent, or Firm* — Thomas Mahon

(57) ABSTRACT

In an implementation, a hydraulically-powered robot has a first body portion having a first internal volume, a second body portion having a second internal volume, and a plurality of hydraulic hoses. The second body portion is rotatably coupled to the first body portion. Each hydraulic hose of the plurality of hydraulic hoses includes a respective first hose portion positioned within the first internal volume of the first body portion and a respective second hose portion positioned within the second internal volume of the second body portion. The plurality of hydraulic hoses is arranged in a helical configuration about an axis that extends from the first internal volume of the first body portion to the second internal volume of the second body portion. A path of the helical configuration of the plurality of hydraulic hoses may traverse a restricted space between the first body portion and the second body portion.

20 Claims, 6 Drawing Sheets

(56)                    References Cited

U.S. PATENT DOCUMENTS

| 2011/0252913 | A1* | 10/2011 | Ibayashi | ............. | B25J 19/0025 |
| | | | | | 901/19 |
| 2011/0252914 | A1* | 10/2011 | Ibayashi | ............. | B25J 19/0025 |
| | | | | | 74/490.02 |
| 2014/0020498 | A1* | 1/2014 | Adachi | ................... | B25J 18/00 |
| | | | | | 901/23 |

* cited by examiner

HELICAL HYDRAULIC HOSE CONFIGURATION

TECHNICAL FIELD

The present systems, devices, and methods generally relate to hydraulic hose configurations, and particularly relate to hydraulic hose configurations for passthroughs in hydraulically-actuated robotic arms.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots require user input, and can be operated by humans. Other robots have a degree of autonomy, and can operate, in at least some situations, without human intervention. Some autonomous robots are designed to mimic human behavior. Autonomous robots can be particularly useful in applications where robots are needed to work for an extended time without operator intervention, to navigate within their operating environment, and/or to adapt to changing circumstances.

Hydraulics is a technology involving mechanical properties and use of liquids, which is based on a theoretical foundation provided by fluid mechanics. In fluid power applications, hydraulics can be used for the generation, control, transmission, and distribution of power. In robotic applications, hydraulics can be used, alone or in combination with electric motors and other power sources, to distribute power to a robot's components, e.g., actuators.

BRIEF SUMMARY

A hydraulically-powered robot may be summarized as comprising a first body portion having a first internal volume, a second body portion having a second internal volume, the second body portion rotatably coupled to the first body portion, and a plurality of hydraulic hoses, wherein each hydraulic hose of the plurality of hydraulic hoses includes a respective first hose portion positioned within the first internal volume of the first body portion and a respective second hose portion positioned within the second internal volume of the second body portion, and wherein the plurality of hydraulic hoses is arranged in a helical configuration about an axis that extends from the first internal volume of the first body portion to the second internal volume of the second body portion.

In some implementations, a path of the helical configuration of the plurality of hydraulic hoses traverses a restricted space between the first body portion and the second body portion.

In some implementations, the first body portion includes at least a portion of a robotic arm and the second body portion includes an end effector. The end effector may include a robotic hand.

In some implementations, a respective volume of each hydraulic hose of the plurality of hydraulic hoses is at least partially filled with a hydraulic fluid. The hydraulic fluid may be an oil.

In some implementations, the hydraulically-powered robot further comprises a hydraulic control system, the hydraulic control system being hydraulically coupled to the plurality of hydraulic hoses. At least a portion of the hydraulic control system may be housed in the first body portion. The hydraulic control system may include a hydraulic pump, a reservoir for storing a first partial volume of a hydraulic fluid, the reservoir hydraulically coupled to an inlet of the hydraulic pump, the reservoir configurable to provide a positive pressure to the inlet of the hydraulic pump, and an accumulator for holding a second partial volume of the hydraulic fluid under pressure, the accumulator hydraulically coupled to an outlet of the hydraulic pump. The hydraulically-powered robot may further comprise a hydraulically-actuated component, the hydraulically-actuated component hydraulically coupled to the hydraulic control system by at least one of the plurality of hydraulic hoses. The hydraulically-actuated component may be housed in the second body portion. The hydraulic control system may further comprise a pressure valve and an exhaust valve, the pressure valve and the exhaust valve operable to control the hydraulically-actuated component. The hydraulically-actuated component may be an actuation piston. A path of the helical configuration of the plurality of hydraulic hoses may traverse a restricted space between the hydraulic control system and the hydraulically-actuated component. The restricted space may be a pivot joint. The hydraulically-actuated component may be physically coupled to an end effector and hydraulically-actuatable to cause a motion of at least a portion of the end effector.

In some implementations, a path of the helical configuration of the plurality of hydraulic hoses traverses a pivot joint. The pivot joint may be a robotic wrist.

In some implementations, the plurality of hydraulic hoses includes at least ten hydraulic hoses.

In some implementations, the helical configuration of the plurality of hydraulic hoses forms an internal conduit along the axis that extends from the first internal volume of the first body portion to the second internal volume of the second body portion. The first body portion may house a first electrical component, the second body portion may house a second electrical component, and the first electrical component electrically communicatively may be coupled to the second electrical component by at least one electrical wire routed through the internal conduit.

In some implementations, the helical configuration includes a first layer of hydraulic hoses and a second layer of hydraulic hoses. The first layer of hydraulic hoses may have a first handedness, the second layer of hydraulic hoses has a second handedness, the second handedness different from the first handedness.

In some implementations, a lay length of the helical configuration of the plurality of hydraulic hoses in the first layer of hydraulic hoses is at least 8 times a pitch diameter of the first layer of hydraulic hoses.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

FIG. 5 includes a schematic drawing of the hydraulic hose configuration in the passthrough of FIG. 4.

DETAILED DESCRIPTION

Figure 1:
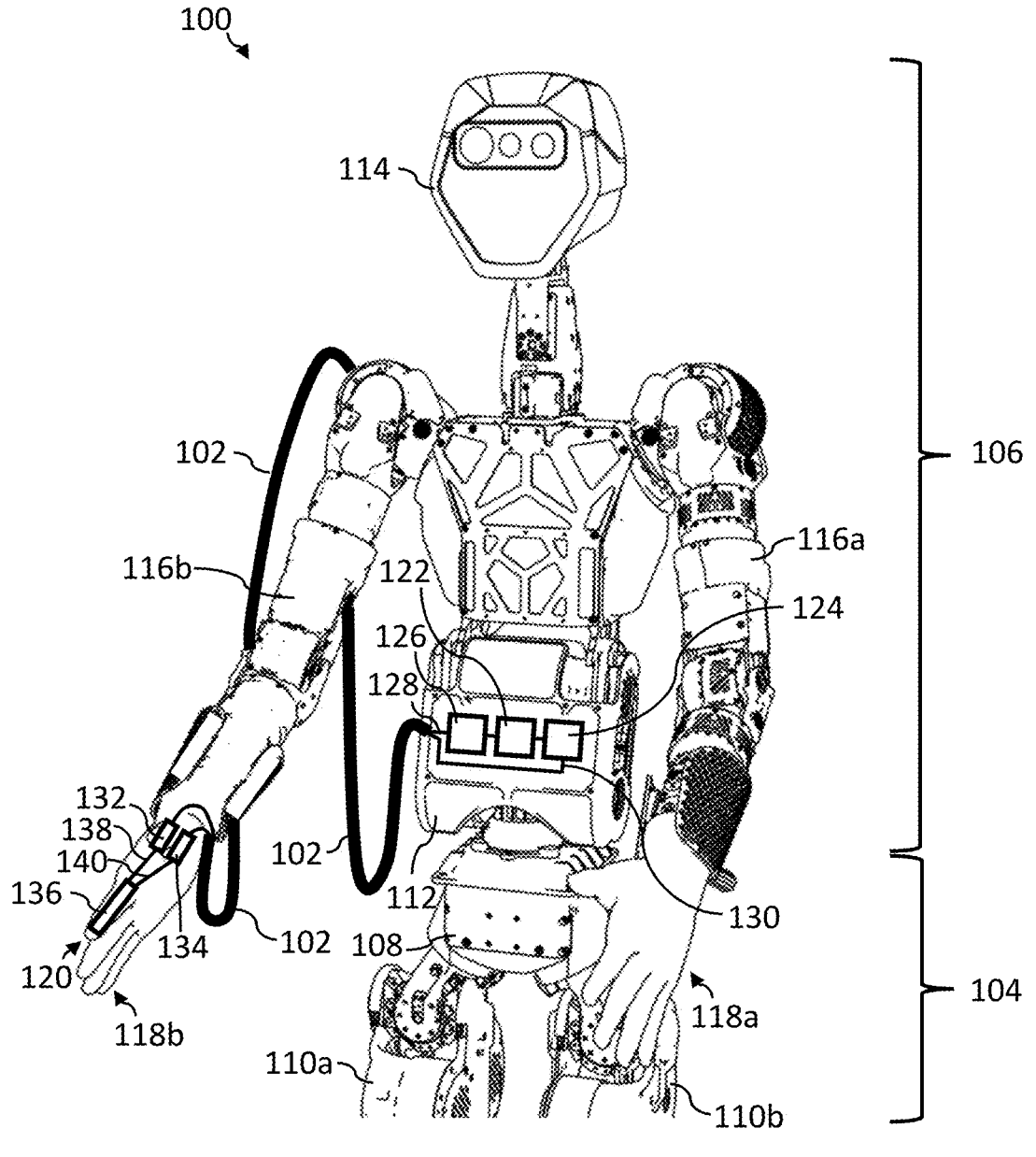
FIG. 1 is a schematic drawing of an example implementation of a hydraulically-powered robot with an externally-routed bundle of hydraulic hoses, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

An end effector (e.g., a humanoid robot hand) powered by a hydraulic system is typically too small to accommodate certain hydraulic components of the hydraulic system. For example, the end effector may be too small to accommodate pressure valves and exhaust valves for multiple hydraulic actuators being used to control multiple degrees of freedom (DOFs) in the end effector. The valves can be housed outside the end effector, e.g., in a robotic arm as described in U.S. Provisional Patent Application Ser. No. 63/191,732, filed May 21, 2021 and entitled "Systems, Devices, And Methods For A Hydraulic Robotic Arm" (now U.S. Non-Provisional patent application Ser. No. 17/749,536), which is incorporated herein by reference in its entirety. Multiple hydraulic hoses can be routed to the end effector, usually through a pivot joint (e.g., a wrist) between the robotic arm and the end effector. In the case of a humanoid robot, multiple hydraulic hoses can be routed between hydraulic components (e.g., valves) housed outside the hand and hydraulic components (e.g., actuators) housed in the hand. In one implementation, to provide eighteen (18) DOFs, two of which are double-acting and hydraulically coupled to two hoses each, there are twenty (20) hydraulic hoses routed through the wrist to the hand.

It can be beneficial to at least reduce the possibility of interference of the hydraulic hoses with operation of the robot, for example in the movement of the robotic arm or the hand. Where the hydraulic hoses are routed through a wrist joint between the robotic arm and the hand, it can be desirable that the hydraulic hoses cause little or no restriction of movement of the wrist joint. The present technology provides systems and methods for passing multiple hydraulic hoses through a restricted space (e.g., a wrist joint) while leaving space for other elements (e.g., electrical wiring) that occupy and/or traverse the same restricted space, and while causing little or no restriction of movement of the restricted space.

A restricted space may be a space that is restricted in volume, where it may be difficult to accommodate hydraulic hoses because there is insufficient room to accommodate the hydraulic hoses easily. A restricted space may also be a space with another kind of restriction. For example, a restricted space may include moving components that can interfere with (e.g., twist, pinch, bend, deform, or otherwise disrupt) hydraulic hoses in the space and/or hydraulic hoses traversing the space. A restricted space may have a volume and/or a shape that can change during operation, e.g., when the robot is in motion or is executing a task.

The technology described in the present application includes systems, devices, and methods for hydraulically-powered robots. In particular, the present application describes hydraulically-powered systems for controlling an end effector of a robot. One aspect of the technology described below includes a helical configuration of hydraulic hoses for passthroughs in pivot joints and other restricted spaces.

In some applications of robotic systems in general, and humanoid robots in particular, it can be desirable for end effectors to have sufficient power and precision while fitting within a certain form factor. It can also be desirable for couplings (e.g., cables, hoses, wires, etc.) between the end effector and other components of the robotic system to be at least partially internal to the robot. External couplings can be unsightly, and can increase the external dimensions of the robot making it more difficult for the robot to operate in restricted spaces. External couplings can also be a hazard, and may cause damage to the robot, or the robot's environment, if the couplings snag on an object in the robot's environment, for example.

Technology described in the present application includes hydraulic systems to provide power to an end effector of a robotic system (e.g., to a hand of a humanoid robot), wherein some or all of the hydraulic system is adapted and/or miniaturized to fit at least partially inside the robot (e.g., inside a robotic arm).

In some implementations, the robot includes one or more pivot joints. A pivot joint allows for rotational motion. One example of a pivot joint is a ball-and-socket joint (e.g., a shoulder joint) which typically allows for a broad range of motion suitable for complex tasks. Another example of a pivot joint is a Condyloid joint (e.g., a wrist joint) which allows movement in two planes. Yet another example of a pivot joint is a hinged joint (e.g., an elbow joint) which allows movement in a single plane only. In some implementations, the hydraulic system is routed through a shoulder, elbow, forearm, wrist and/or knuckle of the robotic arm.

A humanoid robot is a robot having an appearance or a character resembling that of a human. A humanoid robot may be "humanoid" in its entirety or may have humanoid components (e.g., a torso, head, arms, and hands) coupled to non-humanoid components (e.g., a wheeled base). While the following description focuses mainly on controlling a hand of a humanoid robot, a person of skill in the art will appreciate that a hydraulic system in accordance with the present technology may be used to control a hand, a foot, a tail, a head, or any applicable end effector or actuator.

Using hydraulics to drive a robotic arm and/or an end effector can be advantageous for reasons that include the following:

Hydraulics can provide high speed and strength within a humanoid envelope of shape and size.

To accommodate humanoid envelope constraints, components (e.g., a motor) can be located outside the envelope, or at least outside regions where volume is constrained, and hydraulically coupled to components inside the envelope. Components of a hydraulic system are said to be hydraulically coupled if the components are coupled by a hydraulic fluid.

Hydraulics can provide a high power density especially if the motor is outside the constrained volume.

Hydraulics can at least reduce hysteresis in motion. Hysteresis can manifest as a twitchiness in the movement of the robot. Since hydraulic fluid can be substantially incompressible, there can be little or no potential energy to be released at the moment the static coefficients of friction are exceeded.

Hydraulics can provide centralized power and thereby apply full power onto a single degree of freedom (DOF).

Hydraulics can provide high-fidelity control of the robot, i.e., high precision in the movement of the robot.

FIG. 1 is a schematic drawing of an example implementation of a hydraulically-powered robot 100 with an externally-routed bundle of hoses 102, in accordance with the present systems, devices, and methods. Hoses are also referred to in the present application as hydraulic hoses.

Robot 100 comprises a base 104 and a humanoid upper body 106. Base 104 comprises a pelvic region 108 and two legs 110a and 110b (collectively referred to as legs 110). Only the upper portion of legs 110 is shown in FIG. 1. In other example implementations, base 104 may comprise a stand and (optionally) one or more wheels.

Upper body 106 comprises a torso 112, a head 114, a left-side arm 116a and a right-side arm 116b (collectively referred to as arms 116), and a left hand 118a and a right hand 118b (collectively referred to as hands 118). Arms 116 are also referred to in the present application as robotic arms. Arms 116 of robot 100 are humanoid arms. In other implementations, arms 116 have a form factor that is different from a form factor of a humanoid arm.

Hands 118 are also referred to in the present application as end effectors. In other implementations, hands 118 have a form factor that is different from a form factor of a humanoid hand. Each of hands 118 comprises one or more digits, for example, digit 120 of hand 118b. Digits may include fingers, thumbs, or similar structures of the hand or end effector.

In some implementations, base 104 and/or torso 112 of upper body 106 house a hydraulic control system, for example. The hydraulic control system of robot 100 comprises a hydraulic pump 122, a reservoir 124, and an accumulator 126, housed in torso 112. Bundle of hoses 102 includes hoses 128 and 130. Hose 128 provides a hydraulic coupling between accumulator 126 and a pressure valve 132 of the hydraulic control system. Hose 130 provides a hydraulic coupling between an exhaust valve 134 of the hydraulic control system and reservoir 124.

Pressure valve 132 is hydraulically coupled to an actuation piston 136 by a hose 138. Actuation piston 136 is hydraulically coupled to exhaust valve 134 by a hose 140. Hoses 128 and 138, and pressure valve 132, provide a forward path to actuation piston 136. Hoses 130 and 140, and exhaust valve 134 provide a return path to actuation piston 136. Pressure valve 132 and exhaust valve 134 can control actuation piston 136, and can cause actuation piston 136 to move, which can cause a corresponding motion of at least a portion of hand 118b, for example, digit 120.

In some implementations, pressure valve 132 and exhaust valve 134 are electrohydraulic servo valves controlled by a controller (not shown in FIG. 1). The electrohydraulic servo valves are also referred to in the present application as servo valves and servo-controlled valves. The controller may be implemented by any suitable combination of hardware, software, and/or firmware. The controller may include, for example one or more application-specific integrated circuit(s), standard integrated circuit(s), and/or computer program(s) executed by any number of computers, microcontrollers, and/or processors (including, e.g., microprocessors, central processing units). In other implementations, other suitable types of valves may be used.

In other implementations, the hydraulic drive mechanism includes a motor and a drive piston. The drive piston can be propelled forward linearly by a leadscrew that can be coupled to the motor through a flexible shaft coupler. The drive piston can be hydraulically coupled to a hose containing a hydraulic fluid. The hose can extend from the drive piston to an actuation piston located elsewhere on robot 100, for example, in hand 118b. When the drive piston is driven by the motor, the actuation piston can be forced to move, which can cause a corresponding motion of at least a portion of robot 100.

The hydraulic fluid in the hydraulic hoses of FIG. 1 (including hoses 128 and 130) can be an oil, for example, such as peanut oil or mineral oil.

Each of hands 118 may have more than one degree of freedom (DOF). In some implementations, each hand has up to eighteen (18) DOFs. Each DOF can be driven by a respective actuation piston (for example, actuation piston 136). For clarity of illustration, only one actuation piston is shown in FIG. 1. Each actuation piston may be located in hands 118.

Single-action pistons can use a spring to provide a return action for the piston. A DOF may be double-acting to enable a push-pull motion, which means there is a respective hose coupled to each side of the actuation piston. In one implementation, there are two double-acting DOFs, and consequently twenty (20) hoses running to each of hands 118 to control eighteen (18) DOFs of each hand. For example, in FIG. 1, robot 100 includes hoses 128 and 130 that belong to bundle of hoses 102 that passes behind, or alongside, torso 112 and around the outside of arm 116b. In some implementations, bundle of hoses 102 can accommodate twenty (20) one-eighth inch (⅛ in.) hoses.

A shortcoming of the implementation of robot 100 shown in FIG. 1 can be a presence of external hydraulic coupling (e.g., bundle 102 of FIG. 1). As shown in FIG. 1, a bundle of hydraulic hoses may run between hydraulic components located, for example, in the base or torso of the robot, and actuators located, for example, in an end effector at the end of a robotic arm. As described above, in some implementations, there can be as many as twenty (20) one-eighth inch (⅛ in.) hoses in a bundle. As previously described, the bundle of hoses can increase the overall dimensions of the robot, make it harder to fit into restricted spaces, and add a risk the bundle will snag on objects in the robot's environment thereby causing damage to the robot and/or its environment.

Bundle 102 typically includes several adjacent hydraulic hoses packed together to form a bundle where the bundle has a honeycomb cross-section. In this configuration, bundle 102 can be stiff and difficult to bend. In one implementation of bundle 102, the hydraulic hoses (e.g., hoses 128 and 130) have an outer diameter of ⅛".

As will be described below with reference to FIGS. 2, 3, 4, and 5, it can be desirable for a bundle of hydraulic hoses to be more flexible, especially if the bundle is routed internally to the robot e.g., through a pivot joint. A particular example of a pivot joint for a humanoid robot is the wrist. It is desirable for the wrist to be able to twist and bend. It can be difficult to perform a twisting or bending movement of the wrist if a bundle of hydraulic hoses with a conventional honeycomb cross-section is routed through the wrist.

The technology described below provides an improved geometry for routing hydraulic hoses through a pivot joint, e.g., a wrist.

Figure 2:
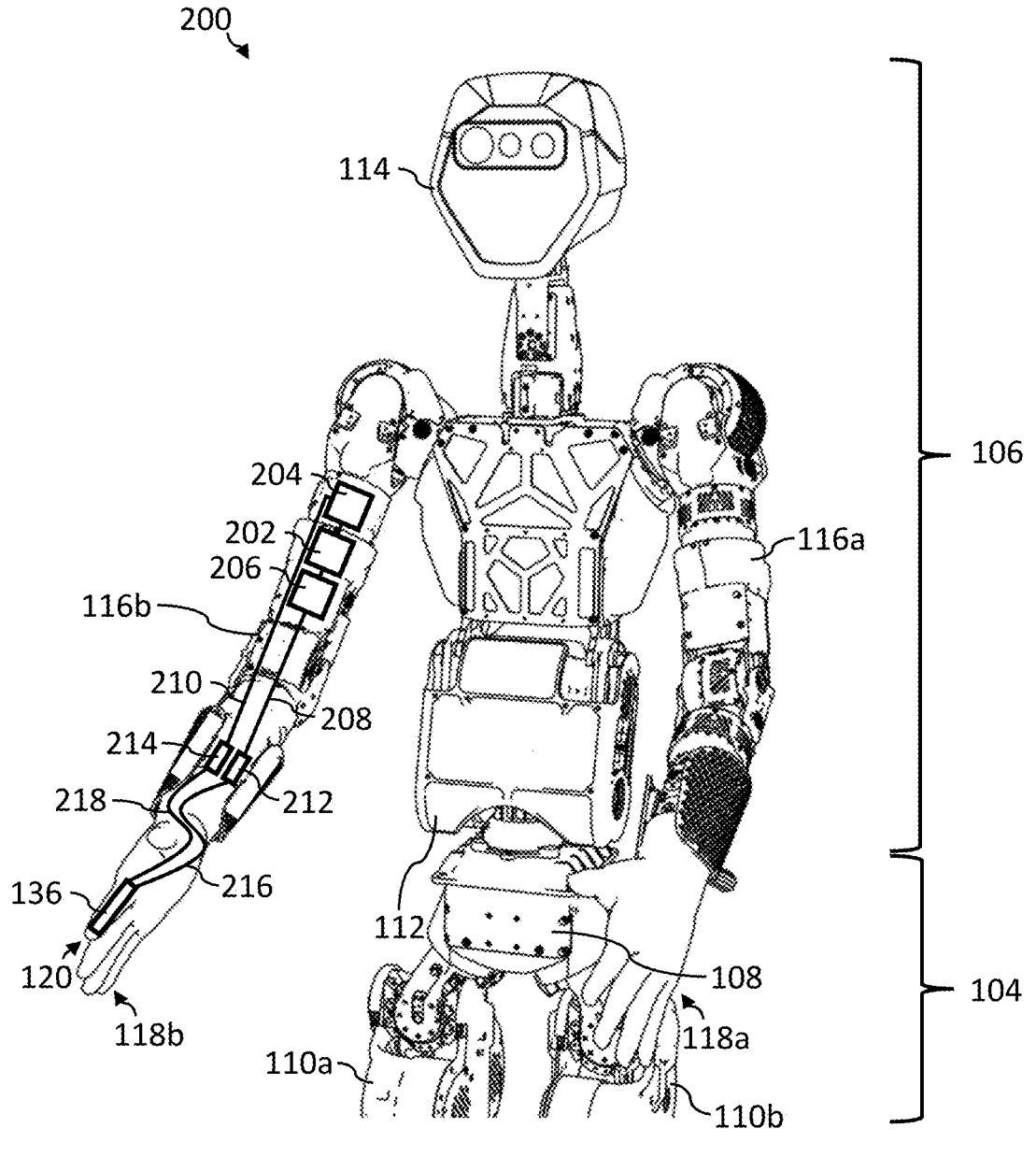
FIG. 2 is a schematic drawing of an example implementation of a hydraulically-powered robot with a hydraulic pump integrated with an arm of the robot, in accordance with the present systems, devices, and methods.

FIG. 2 is a schematic diagram of an example implementation of a hydraulically-powered robot 200 with a hydraulic pump 202 integrated with arm 116b of robot 200, in accordance with the present systems, devices, and methods. Components of robot 200 that are the same as, or similar to, components of robot 100 of FIG. 1 have the same reference numerals.

Robot 200 differs from robot 100 of FIG. 1 in the distribution of components of the hydraulic system and the routing of hydraulic hoses to actuation pistons (e.g., actuation piston 136). An actuation piston is an example of a hydraulically-activated component. As described with reference to FIG. 1, robot 100 includes bundle of hoses 102 that runs externally from torso 112 to hand 118b. Bundle of hoses 102 can have a number of disadvantages, as described above.

Robot 200 comprises a hydraulic pump 202, a reservoir 204, and an accumulator 206 that are housed in robotic arm 116b. Housing hydraulic pump 202, reservoir 204, and accumulator 206 in robotic arm 116b advantageously eliminates the external bundle of hoses.

Robot 200 further comprises hoses 208 and 210. Hose 208 provides a hydraulic coupling between accumulator 206 and a pressure valve 212. Hose 210 provides a hydraulic coupling between an exhaust valve 214 and reservoir 204. Robot 200 further comprises hose 216 which runs from pressure valve 212 to actuation piston 136, and hose 218 which runs from actuation piston 136 to exhaust valve 214. Hoses 208 and 216, and pressure valve 212, provide a forward path to actuation piston 136. Hoses 210 and 218, and exhaust valve 214 provide a return path from actuation piston 136.

Hydraulic hoses are conventionally bundled with a honeycomb cross-section which, as described above, can cause the bundle to be stiff and inflexible. In restricted spaces (e.g., in the interior of a robot, particularly in pivot joints of a robot), it can be advantageous to increase flexibility of a bundle of hydraulic hoses housed in, or traversing, a restricted space, e.g., a pivot joint. It can also be advantageous to arrange the hydraulic hoses so as to facilitate routing of other elements (e.g., electrical wiring) through the same restricted space.

The technology described in the present application provides an improved geometry for a bundle of hydraulic hoses routed to an end effector of a robot through an internal volume of the robot, and is particularly suitable for a bundle of hydraulic hoses passing through a restricted space internal to the robot e.g., a pivot joint.

Though the example implementations of FIGS. 1 and 2 of hydraulically-powered robots with hydraulic systems include only a single hydraulic system, a person of skill in the art will appreciate that a hydraulically-powered robot may include multiple hydraulic systems. In some implementations, at least some of the multiple hydraulic systems are hydraulically-isolated. In some implementations, at least some of the multiple hydraulic systems share a common hydraulic pump.

It can be beneficial for a hydraulically-powered robot to have multiple hydraulically-isolated hydraulic systems. For example, a hydraulically-powered robot may have multiple components or devices that include hydraulic actuators. A single hydraulic system operable to control the hydraulic actuators of multiple components or devices may be too large, complex, or costly for practical implementations. It may be difficult, for example, to route hydraulic hoses (e.g., internally) from a single shared pump to multiple components or devices located in different regions of the robot. A hydraulic system dedicated to a single component or device, or dedicated to a subset of the multiple components or devices, may be more localized, and more readily adapted to fit within a desired form factor.

Figure 3:
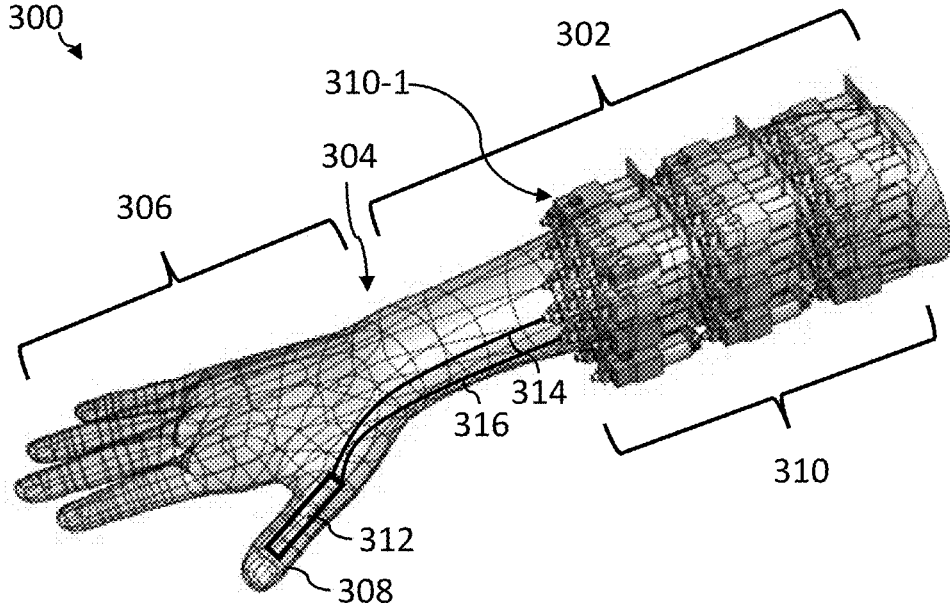
FIG. 3 is a schematic drawing of an example implementation of a portion of a hydraulic system in a forearm, wrist, and hand of a robot (e.g., the robot of FIG. 2), in accordance with the present systems, devices, and methods.

FIG. 3 is a schematic drawing of an example implementation of a portion of a hydraulic system in a forearm 302, wrist 304, and hand 306 of a robot (e.g., robot 200 of FIG. 2), in accordance with the present systems, devices, and methods. Hand 306 includes a digit 308.

Forearm 302 includes a set of valves 310 which is integrated with forearm 302. Valves 310 include valve 310-1. (Only one valve is separately labeled for clarity of illustration.) Valves 310 may include pressure valves and exhaust valves. Valves 310 may include electrohydraulic servo valves, and may be operated by a controller (not shown in FIG. 3). In other implementations, valves 310 may be located elsewhere on the robot, e.g., in the upper arm or the torso. In some implementations, forearm 302 includes other hydraulic components of the hydraulic system.

Digit 308 includes an actuation piston 312 integrated with digit 308. Actuation piston 312 is hydraulically coupled to valves 310 via a pressure hose 314 and an exhaust hose 316. In some implementations, actuation piston 312 is a double-acting actuation piston, and is hydraulically coupled to two additional hoses (not shown in FIG. 3).

Pressure hose 314 and exhaust hose 316 pass through wrist 304. Wrist 304 can be a restricted space, and it can be advantageous for hoses 314 and 316 to be bundled in a geometry that is sufficiently flexible to navigate wrist 304 without affecting a motion of wrist 304, e.g., a twisting or bending motion of wrist 304.

Figure 4:
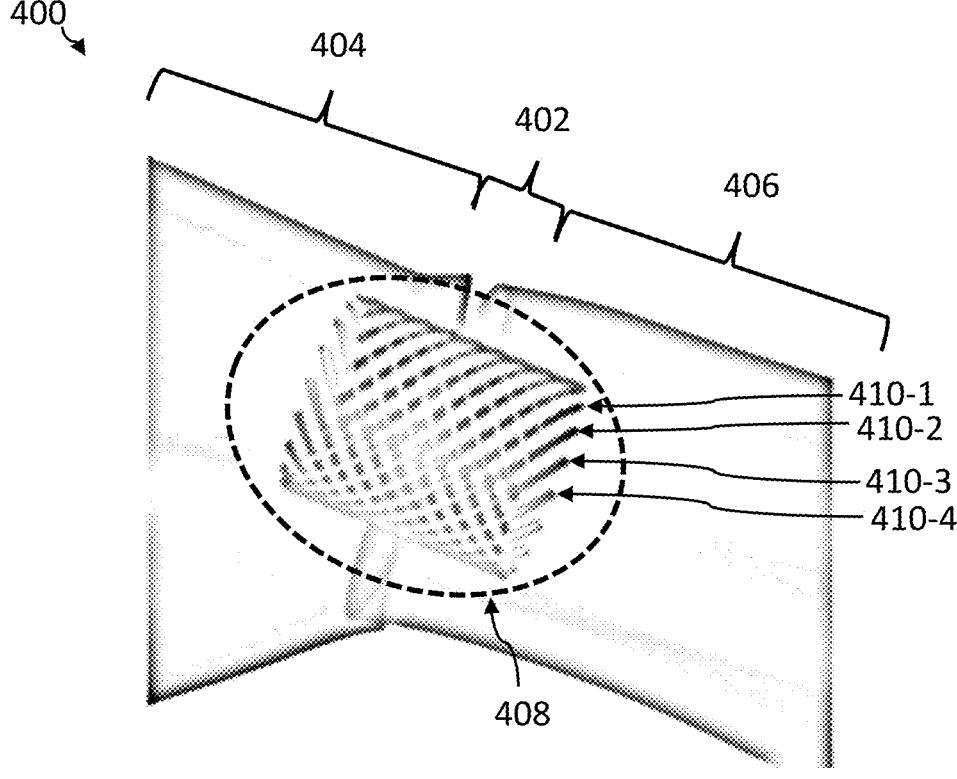
FIG. 4 is a schematic drawing of a longitudinal section through a portion of a robot (e.g., the robot of FIG. 2) that includes a restricted space between a first body portion and a second body portion, in accordance with the present systems, devices, and methods.

FIG. 4 is a schematic drawing of a longitudinal section through a portion 400 of a robot that includes a restricted space 402 between a first body portion 404 and a second body portion 406, in accordance with the present systems, devices, and methods.

First body portion 404 has a first internal volume, and second body portion 406 has a second internal volume. In some implementations, second body portion 406 is rotatably coupled to first body portion 404.

In some implementations, portion 400 of the robot is a portion of a robotic arm. In some implementations, the robot is a humanoid robot, first body portion 404 is a forearm of the humanoid robot, second body portion 406 is a hand, and restricted space 402 is a wrist.

Portion 400 includes a bundle 408 of hydraulic hoses housed in and/or traversing restricted space 402. Bundle 408 includes hydraulic hoses 410-1, 410-2, 410-3, 410-4, and more (collectively referred to as hoses 410). For clarity, only four of hoses 410 are individually labeled in FIG. 4.

Each hydraulic hose of hose 410 has a respective first hose portion positioned within the first internal volume of first body portion 404, and a respective second hose portion positioned within the second internal volume of second body portion 406.

Hoses 410 are arranged in bundle 408 with a helical geometry. Each hose of hoses 410 follows a helical trajectory through restricted space 402. The helical trajectory of each hose of hoses 410 is a helix about an axis that extends from the first internal volume of first body portion 404 to the second internal volume of second body portion 406.

Hoses 410 may be arranged in one or more layers. Bundle 408 may include one or more layers of hoses 410. Each layer of hoses 410 in bundle 408 may be a respective helix.

A helix can be either a right-handed helix or a left-handed helix. With the line of sight along the axis of the helix, if a clockwise screwing motion moves the helix away from the observer, then it is called a right-handed helix. If a clockwise screwing motion moves the helix towards the observer, then it is a left-handed helix.

Hoses 410 may be arranged in a right-handed helix or a left-handed helix. In some implementations, the handedness of at least some of the helices in different layers of hoses 410 in bundle 408 are different, i.e., bundle 408 includes at least one subset of hoses 410 arranged in a right-handed helix and at least one subset of hoses 410 arranged in a left-handed helix. An arrangement of hoses in multiple layers, where the handedness of at least two layers are different from each other may also be referred to as a contra-helical construction of bundle 408. In some implementations, the handedness of helices in different layers of hoses 410 in bundle 408 are the same as one another.

Furthermore, in implementations where a first subset of hoses 410 are arranged in a right-handed helix, and a second subset of hoses 410 are arranged in a left-handed helix, the second subset of hoses 410 may be in the same layer and/or a different layer than the first subset of hoses 410.

Bundling of hoses 410 can be performed on a tubular or planetary-type helical bundling apparatus such that little or no residual twist is introduced into individual hoses in bundle 408.

The axial distance per turn is referred to in the present application as a lay length. In some implementations, the lay length of a helical configuration of hydraulic hoses in a layer of hydraulic hoses is at least 8 times a pitch diameter of the layer of hydraulic hoses, where the pitch diameter is measured from center-to-center of diametrically opposed hoses in the layer.

Figure 5:
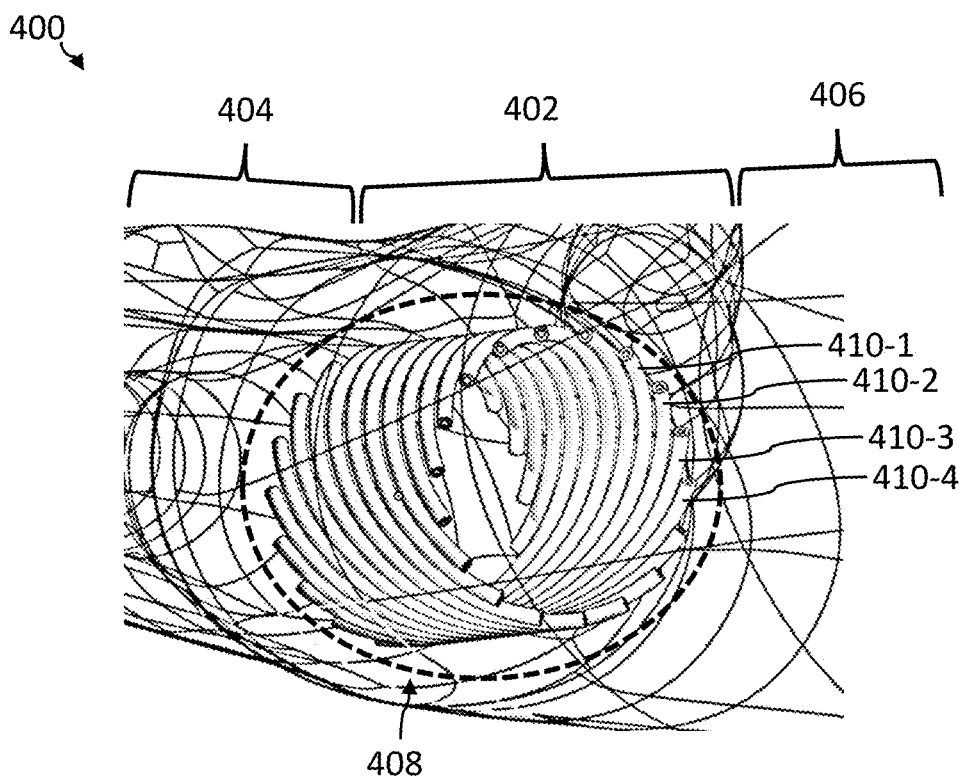
FIG. 5 is a schematic three-dimensional drawing of an interior of the portion of the robot of FIG. 4, in accordance with the present systems, devices, and methods.

FIG. 5 is a schematic three-dimensional drawing of an interior of portion 400 of the robot of FIG. 4, in accordance with the present systems, devices, and methods. FIG. 5 includes a schematic drawing of the hydraulic hose configuration in the passthrough of FIG. 4.

Portion 400 includes restricted space 402, first body portion 404, and second body portion 406. Portion 400 further includes bundle 408 of hoses 410.

In one implementation, bundle 408 of FIGS. 4 and 5 includes twenty (20) hydraulic hoses 410, each hose of hoses 410 has an outer diameter of ¹⁄₁₆', and bundle 408 is a helix with a diameter of 30 mm.

If restricted space 402 is a pivot joint (e.g., a wrist of a humanoid robot), helical bundle 408 of FIGS. 4 and 5 allows the pivot joint to flex in both axes. Helical bundle 408 improves an ease with which the wrist can bend and/or twist. Helical bundle 408 typically has less stiffness than a conventional honeycomb cross-section bundle of hydraulic hoses. Helical bundle 408 has few or no hoses interior to the bundle which can give helical bundle 408 greater flexibility than a honeycomb cross-section bundle.

Movements of a wrist of a humanoid robot can occur around two axes when a hand of the humanoid robot is in full supination (i.e., when a forearm and the hand are rotated so that a palm faces forward or upward). The wrist can have flexion-extension movements about a transverse axis, and adduction-abduction movements about an antero-posterior axis. Helical bundle 408 can improve flexibility of the wrist movements about at least one of the two axes.

Advantages of the helical geometry of bundle 408 include a) a stronger, and more precisely controllable, pivot joint, b) more packaging space in the first and second body portions, and c) greater flexibility in mechanical design.

Figure 6:
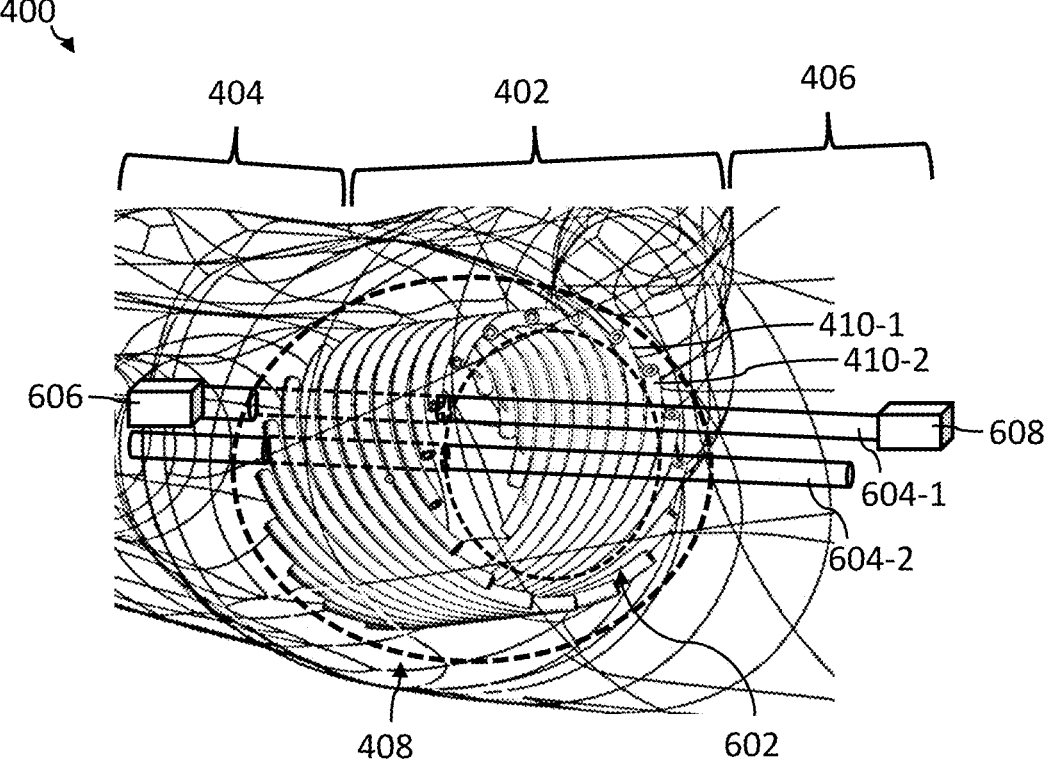
FIG. 6 is a schematic three-dimensional drawing of the interior of FIG. 5 with the hydraulic hose configuration in the passthrough of FIG. 4 and an internal conduit to accommodate one or more coupling elements (e.g., electrical wiring, fiber-optic cabling and the like), in accordance with the present systems, devices, and methods.

FIG. 6 is a schematic three-dimensional drawing of interior 400 of FIG. 5 with the hydraulic hose configuration in the passthrough of FIG. 4 and an internal conduit 602 to accommodate one or more coupling elements (e.g., electrical wiring, fiber-optic cabling and the like), in accordance with the present systems, devices, and methods.

Portion 400 includes restricted space 402, first body portion 404, and second body portion 406. Portion 400 further includes bundle 408 of hoses 410. The inside of bundle 408 includes internal conduit 602 which can accommodate other coupling elements 604-1, 604-2 and more (collectively referred to as coupling elements 604). Coupling elements 604 can include electrical wiring, fiber-optic cabling and the like. Since coupling elements 604 traverse restricted space 402 via internal conduit 602, coupling elements 604 have little or no effect on the flexibility of the rotatable coupling of second body portion 406 to first body portion 404.

Coupling element 604-1 is an electrical wire providing an electrical communicative coupling between an electrical component 606 in first body portion 404 and another electrical component 608 in second body portion 406.

While applicable in the general case of a robot having a hydraulic system including external components, the present technology is particularly advantageous in the case of a self-contained hydraulic system where hydraulic hoses, and other pathways (e.g. an internal conduit for carrying electrical wiring and/or fiber optic cabling and the like), are routed internal to the robot (e.g., in the forearm, wrist, and hand of a humanoid robot).

A further advantage of introducing a helical twist in bundling the hydraulic hoses is that it can act to neutralize tension and compression forces that occur in the hydraulic hoses each time the bundle is bent or flexed, e.g., during motion of the robot.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A hydraulically-powered robot comprising:
a first body portion having a first internal volume, wherein the first body portion houses a first electrical component;
a second body portion having a second internal volume, the second body portion rotatably coupled to the first body portion, wherein the second body portion houses a second electrical component; and
a plurality of hydraulic hoses, wherein each hydraulic hose of the plurality of hydraulic hoses includes a respective first hose portion positioned within the first internal volume of the first body portion and a respective second hose portion positioned within the second internal volume of the second body portion, and wherein the plurality of hydraulic hoses is arranged in a helical configuration about an axis that extends from the first internal volume of the first body portion to the second internal volume of the second body portion, wherein the helical configuration of the plurality of hydraulic hoses forms an internal conduit along the axis that extends from the first internal volume of the first body portion to the second internal volume of the second body portion, the first electrical component electrically communicatively coupled to the second electrical component by at least one electrical wire routed through the internal conduit.

2. The hydraulically-powered robot of claim 1, wherein a path of the helical configuration of the plurality of hydraulic hoses traverses a restricted space between the first body portion and the second body portion.

3. The hydraulically-powered robot of claim 1, wherein the first body portion includes at least a portion of a robotic arm and the second body portion includes an end effector.

4. The hydraulically-powered robot of claim 1, further comprising a hydraulic control system hydraulically coupled to the plurality of hydraulic hoses, wherein at least a portion of the hydraulic control system is housed in the first body portion.

5. The hydraulically-powered robot of claim 1, further comprising a hydraulic control system hydraulically coupled to the plurality of hydraulic hoses, wherein the hydraulic control system includes:
a hydraulic pump;
a reservoir for storing a first partial volume of a hydraulic fluid, the reservoir hydraulically coupled to an inlet of the hydraulic pump, the reservoir configurable to provide a positive pressure to the inlet of the hydraulic pump; and
an accumulator for holding a second partial volume of the hydraulic fluid under pressure, the accumulator hydraulically coupled to an outlet of the hydraulic pump.

6. The hydraulically-powered robot of claim 1, further comprising a hydraulic control system hydraulically coupled to the plurality of hydraulic hoses and a hydraulically-actuated component hydraulically coupled to the hydraulic control system by at least one of the plurality of hydraulic hoses.

7. The hydraulically-power robot of claim 6, wherein the hydraulically-actuated component is housed in the second body portion.

8. The hydraulically-powered robot of claim 6, the hydraulic control system further comprising a pressure valve and an exhaust valve, the pressure valve and the exhaust valve operable to control the hydraulically-actuated component.

9. The hydraulically-powered robot of claim 6, wherein a path of the helical configuration of the plurality of hydraulic hoses traverses a restricted space between the hydraulic control system and the hydraulically-actuated component.

10. The hydraulically-power robot of claim 9, wherein the restricted space is a pivot joint.

11. The hydraulically-powered robot of claim 1, wherein a path of the helical configuration of the plurality of hydraulic hoses traverses a pivot joint.

12. The hydraulically-powered robot of claim 11, wherein the pivot joint is a robotic wrist.

13. The hydraulically-powered robot of claim 1, wherein the helical configuration includes a first layer of hydraulic hoses and a second layer of hydraulic hoses.

14. The hydraulically-powered robot of claim 13, wherein the first layer of hydraulic hoses has a first handedness, the second layer of hydraulic hoses has a second handedness, the second handedness different from the first handedness.

15. The hydraulically-powered robot of claim 13, wherein a lay length of the helical configuration of the plurality of hydraulic hoses in the first layer of hydraulic hoses is at least 8 times a pitch diameter of the first layer of hydraulic hoses.

16. A hydraulically-powered robot comprising:
a first body portion having a first internal volume;
a second body portion having a second internal volume, the second body portion rotatably coupled to the first body portion; and
a plurality of hydraulic hoses, wherein each hydraulic hose of the plurality of hydraulic hoses includes a respective first hose portion positioned within the first internal volume of the first body portion and a respective second hose portion positioned within the second internal volume of the second body portion, and wherein the plurality of hydraulic hoses is arranged in a helical configuration about an axis that extends from the first internal volume of the first body portion to the second internal volume of the second body portion wherein the helical configuration includes a first layer of hydraulic hoses having a first handedness and a second layer of hydraulic hoses having a second handedness, the second handedness different from the first handedness.

17. The hydraulically-powered robot of claim 16, wherein a path of the helical configuration of the plurality of hydraulic hoses traverses a restricted space between the first body portion and the second body portion.

18. The hydraulically-powered robot of claim 16, wherein the first body portion includes at least a portion of a robotic arm and the second body portion includes an end effector.

19. The hydraulically-powered robot of claim 16, wherein a path of the helical configuration of the plurality of hydraulic hoses traverses a pivot joint.

20. The hydraulically-powered robot of claim 19, wherein the pivot joint is a robotic wrist.

* * * * *